June 28, 1966 J. H. AUER, JR 3,258,745
TRAFFIC RESPONSIVE VEHICLE TRAFFIC CONTROL SYSTEM
Filed April 19, 1962 6 Sheets-Sheet 1

INVENTOR.
J. H. AUER JR.
BY
HIS ATTORNEY

June 28, 1966 J. H. AUER, JR 3,258,745
TRAFFIC RESPONSIVE VEHICLE TRAFFIC CONTROL SYSTEM
Filed April 19, 1962 6 Sheets-Sheet 2

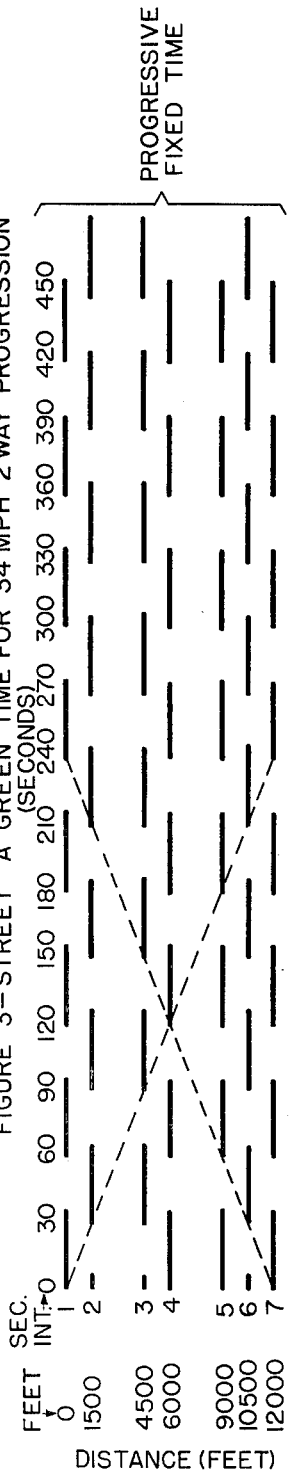

FIG. 2A  FIGURE 3—STREET A GREEN TIME FOR 34 MPH 2 WAY PROGRESSION
PROGRESSIVE FIXED TIME

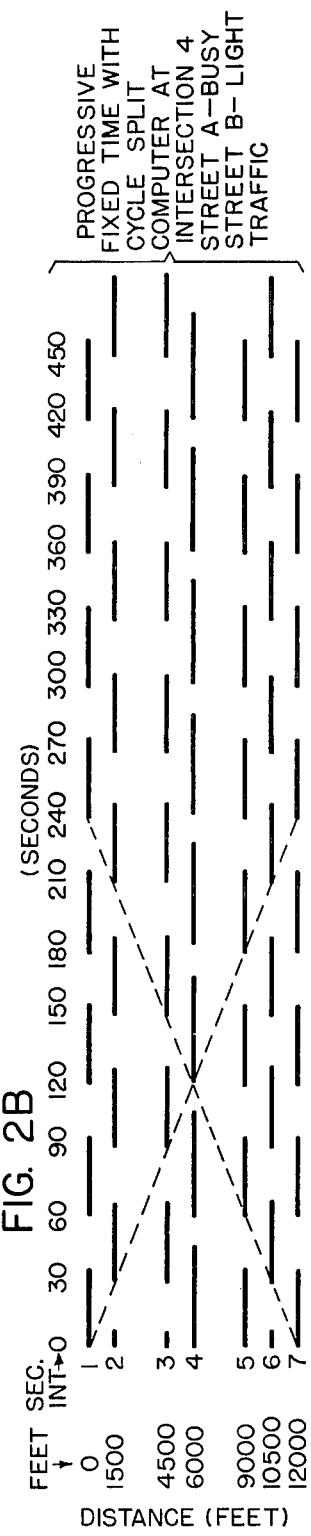

FIG. 2B
PROGRESSIVE FIXED TIME WITH CYCLE SPLIT COMPUTER AT INTERSECTION 4 STREET A—BUSY STREET B—LIGHT TRAFFIC

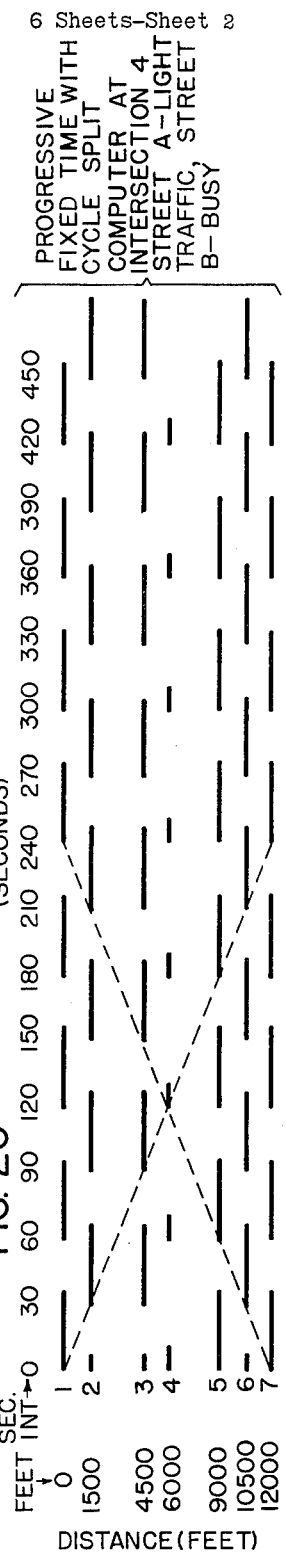

FIG. 2C
PROGRESSIVE FIXED TIME WITH CYCLE SPLIT COMPUTER AT INTERSECTION 4 STREET A—LIGHT TRAFFIC, STREET B—BUSY

June 28, 1966   J. H. AUER, JR   3,258,745
TRAFFIC RESPONSIVE VEHICLE TRAFFIC CONTROL SYSTEM
Filed April 19, 1962   6 Sheets-Sheet 3

*INVENTOR.*
J. H. AUER JR.
BY
*Forest H. Hitchcock*
HIS ATTORNEY

June 28, 1966     J. H. AUER, JR     3,258,745
TRAFFIC RESPONSIVE VEHICLE TRAFFIC CONTROL SYSTEM
Filed April 19, 1962     6 Sheets-Sheet 4

INVENTOR.
J. H. AUER JR.
BY
HIS ATTORNEY

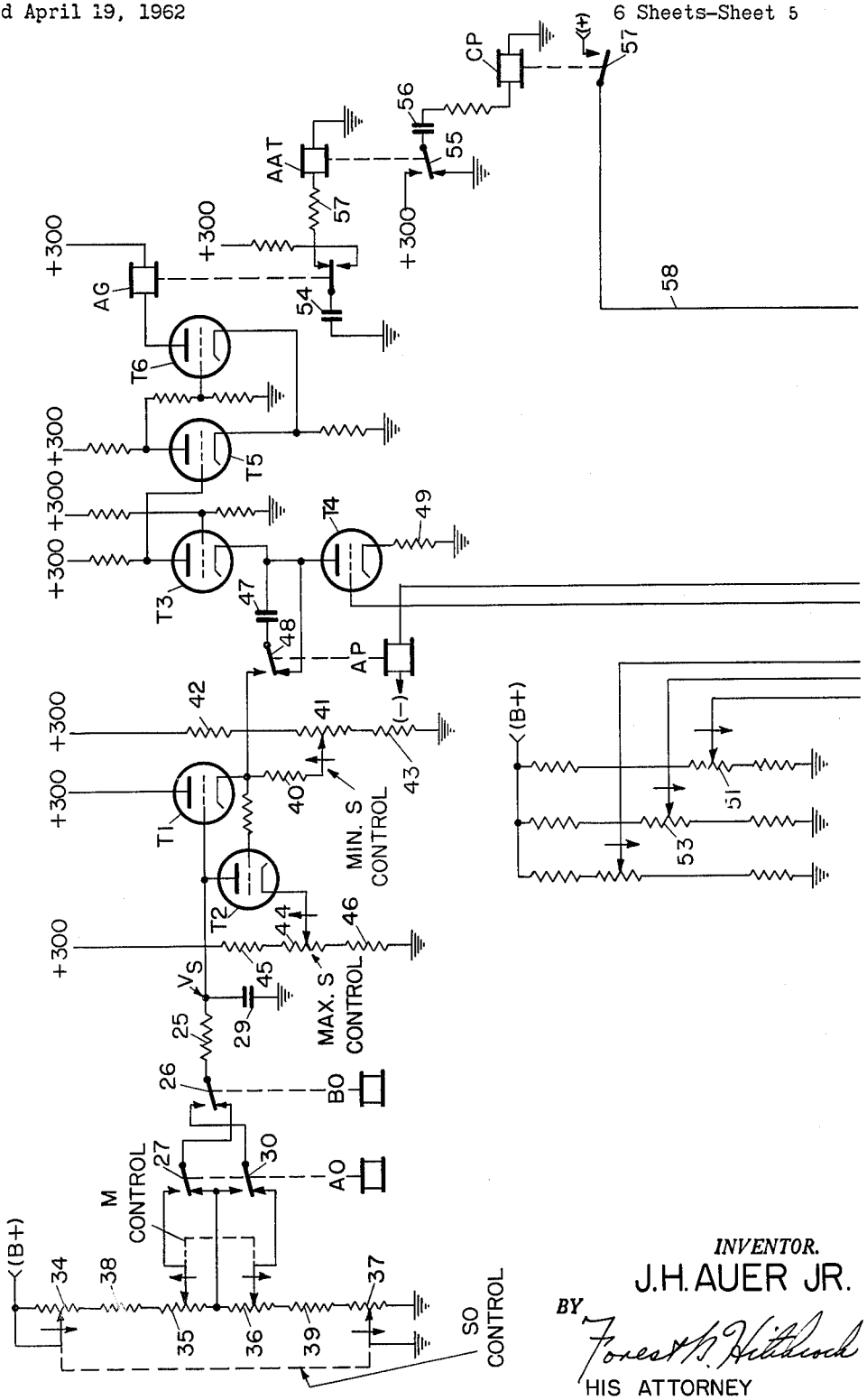

INVENTOR.
J.H. AUER JR.
BY
Forest B. Whitlock
HIS ATTORNEY

United States Patent Office 3,258,745
Patented June 28, 1966

3,258,745
TRAFFIC RESPONSIVE VEHICLE TRAFFIC
CONTROL SYSTEM
John H. Auer, Jr., Rochester, N.Y., assignor to
General Signal Corporation
Filed Apr. 19, 1962, Ser. No. 188,812
16 Claims. (Cl. 340—37)

The present invention is a continuation-in-part to my prior copending application Serial No. 133,616 filed August 24, 1961, and assigned to the assignee of the present invention.

This invention relates to a system for the control of traffic signals, and more particularly pertains to a system wherein the signals are controlled in accordance with traffic congestion.

Fixed time signals for the control of vehicular traffic are in wide use and in many instances they provide adequate control of traffic. It has been found, however, that the traffic-handling capacity of highways may often be increased appreciably by providing vehicle-actuated control over the signals. In general, this is accomplished by providing a vehicle detector along one or more approaches to an intersection and then controlling the length of the operating cycle, and/or also the splitting of the cycle between the different directions of travel in accordance with the output of the various vehicle detectors.

In some of the presently used, vehicle-actuated traffic control systems, preference is usually given to traffic moving along a main artery by providing that the signal thereon will provide a continuous green aspect until the presence of traffic on an intersecting side street has been detected, at which time the traffic on the side street is given a green signal for at least some minimum interval of time. In some of these systems, the detection of only a single vehicle approaching the intersection from a side street will control the signal system to give a green aspect for that side street, provided only that there has until then been a green signal displayed for the main artery for at least some minimum interval of time. In still other systems, the presence of only a single vehicle on the side street may not immediately cause a green signal to be displayed for traffic on the side street, but instead the amount of time that elapses before a green signal is displayed for such side street is dependent upon the number of vehicles detected as approaching the intersection along such side street, with the waiting interval being, of course, reduced when the traffic is at a higher level. Even in such a system, however, even the single vehicle on the side street will eventually be effective to cause a green signal to be displayed for it, but where the traffic on the side street is light, then frequently a longer time interval must elapse before it receives a green signal.

Generally, in these systems of the prior art, it is provided that the length of time throughout which the side street will continue to receive a green signal will be dependent upon the number of vehicles which have passed the detector on that side street. Thus, as traffic becomes heavier, more vehicle counts will be produced from the vehicle detectors, and, in response thereto, successive increments will be added to the green time for the side street up to some predetermined maximum value, at which time the signal will go to red for the side street and traffic will again be permitted to move along the main artery. In some of the more elaborate systems, vehicle detectors are placed as well along one or more lanes of the main artery so that the amount of traffic on the main artery can as well be gauged and thereby make it possible to control the amount of green time which is displayed by the signals for traffic moving along the main artery.

Although these prior art systems just described are frequently more effective than fixed time control of the traffic signals, their effectiveness often decreases at times when their proper functioning becomes more critical. Thus, it is a characteristic of these systems that the vehicle detectors employed are not actually presence detectors but merely sense the passage of vehicles and thus provide the same kind of output for each passing vehicle, regardless of its length or of its speed. The detector means frequently used is of the type in which a treadle is mounted flush with the roadway surface and is actuated by the wheels of the vehicles as they roll over the treadle. Such a detector thus generally provides two output pulses for each passing auto, but will produce four or more successive actuations for a single passing truck so that the number of output pulses produced by such a detector is not a clear indication of the number of vehicles passing the detector location. Moreover, such a detector cannot provide any information as to the speed of moving vehicles. It is recognized that the successive pulses produced by the front and rear wheels of a car are more closely spaced when that car is moving quickly than when it is moving slowly. However, the difficulties that exist in determining whether two successive pulses have been produced, on the one hand, by the successive wheels of the same vehicle, or, on the other hand, by the rear wheel of one vehicle and the front wheel of another, make it unfeasible to produce output signals from such a detector which will represent more than merely the number of vehicle actuations occurring in a given time.

Because of these shortcomings, which are by no means limited to the treadle type detectors but are indeed inherent in all detectors not of the presence detecting type, their effectiveness in a system intended to evaluate actual traffic congestion is apparent only under conditions of relatively light traffic congestion. At such times, traffic can flow quite freely, and the successive vehicles in a line of traffic at an approach to an intersection will continue to pass the detector so that its rate of output counts increases as the amount of traffic increases. An increment of time may be added to the green phase of the traffic signal upon detection of an increase in traffic with the result that the increased traffic can quite readily be accommodated by being permitted to cross the intersection. Placement of the vehicle detectors at a substantial distance in approach of the intersection ensures that a line-up of a number of cars waiting for a green signal will still not result in a blockage all the way back to the location of the detector, and thus it will be possible for the newly arriving cars to be detected by the vehicle detector and have their approach to the intersection also recognized so that they too will be influential in determining the amount of green time that will be displayed.

Under extremely heavy traffic conditions, however, traffic necessarily moves more slowly and, additionally, the line of vehicles waiting at an intersection for a green signal will become so long that it will soon extend back to the detector location. Under these circumstances, there are vehicles adjacent to or within the detection zone of the detector which are not moving at all for substantial periods of time or which move very slowly even when in motion. This means that a detector which is responsive only to the passage of vehicles and ignores their length and velocity will produce only very few output counts in any given measuring interval and will thus indicate a very low volume of traffic at times when traffic volume is actually at a peak. In other words, under these most critical conditions when it should be recognized by the system that traffic congestion is at its worst, the signal system instead is detecting only a very low volume of traffic, and the signals are then being so controlled that traffic congestion is made more acute rather than being aided.

Another related situation which frequently results is that movement of traffic under high traffic load conditions may be substantially out of phase with the operation of the signal system. Most drivers have experienced the situation where their forward progress actually occurs principally at times when the signal ahead is displaying a stop indication but where their progress is practically nil when the signal ahead is giving a proceed indication. This situation is experienced mostly by vehicles which are at a substantial distance from the signal location and which may thus be in the vicinity of the vehicle detector. This situation further aggravates the problem, particularly when the system is of the kind in which, as previously mentioned, the amount of green time displayed for a particular approach is a function of the amount of traffic detected on the approach during the green phase. Thus, during such green phase, traffic in the vicinity of the detector may be virtually at a standstill and this will result in a relatively short green time for the signal since the system has in fact detected only a small number of vehicles as having passed the detector location.

With these considerations in mind, it is apparent that a vehicle-actuated traffic control system cannot properly be operated by vehicle detectors which are responsive merely to the passage of vehicles since traffic volume (the number of vehicles counted within a unit of time) tends to increase with density (number of vehicles per mile) and with lane occupancy (percentage of road occupied) only for values of density or congestion which are relatively low. In other words, for conditions of relatively light traffic, traffic volume does tend to vary at about the same rate as vehicle density and lane occupancy; however, volume reaches a peak long before density and lane occupancy reach their maximum values as is evidenced by the fact that volume will go to substantially zero as lane occupancy nears one hundred percent. Necessarily, therefore, traffic volume is not a reliable guide to the amount of traffic which must be handled.

It is contemplated by the present invention, therefore, to provide a traffic signal control system in which the vehicle detector used on each approach to a traffic signal is of the presence-detecting type, i.e., it is distinctly operated when a vehicle enters a detection zone defined by the detector and remains in such operated condition for as long as is required for the vehicle to pass through the detection zone. The detector employed may be of the general type shown in the prior copending application of Kendall et al., Serial No. 808,736, filed April 24, 1959, and may also be of the type shown in my prior copending application Serial No. 820,325, filed June 15, 1959.

The vehicle detector disclosed herein for use in the system of this invention differs from that disclosed in these prior applications in that it does not necessarily embody the unique interlocking features provided by use of the pavement reflection pulse. A vehicle detector using the pavement reflection pulse provides a more highly accurate measure of vehicle presence but also requires the use of a separate chassis of electronic equipment for each pair of transmitting and recurring transducers. It has been found that sufficiently accurate vehicle presence signals are obtained for the purposes of this invention by employing vehicle detectors which make use of the vehicle reflection pulses only. The advantage of this is that it permits a substantial economy in the use of apparatus since one chassis of electronic equipment may be used for several pairs of transmitting and receiving transducers. Moreover, the scope of the present invention is such that it may be used with other quite different types of vehicle detectors not employing sonic energy since it is apparent from the appended claims that there is no limitation as to the specific type of presence detector used.

It is further contemplated that the present invention will utilize the vehicle presence signal output of the vehicle detector to provide another different signal which represents a parameter designated as lane "occupancy," and that the lane occupancy signals so produced in response to traffic on the different approaches to an intersection will control the operation of the traffic signals.

The present invention is particularly adapted for use with fixed-time traffic controllers. This means that a fully automated traffic control system can be provided which will make full use of the fixed-time controller currently in use instead of rendering such controls entirely obsolete as usually results when automatic, traffic-responsive systems are substituted for the older fixed-time sytsems. This feature is of exceptional interest to traffic engineers and to municipalities and the like since it means that a fully automated traffic control system can be installed for far less cost than heretofore.

In my prior copending application Serial No. 133,616 already referred to, I have disclossed a system for controlling the traffic signals at an intersection in accordance with traffic occupancy on the different approaches to the intersection, and the result achieved in such a system has been to vary the over-all cycle length in accordance with traffic occupancy and also to control the cycle split. For example, in this prior system, an increase in traffic occupancy on each of the several different approaches to an intersection will produce an increase in the overall cycle time, and it is fully described in the prior application how such increase in cycle time results in more expeditious flow of traffic through the intersection. In the prior application, such increase of traffic occupancy may or may not result in a variation in the cycle split. If traffic on the several different approaches increases in substantially equal proportions, then the over-all cycle time may increase without substantially affecting the cycle split. However, if occupancy increases to a greater extent on one of the approaches than on the other, then the cycle split will be varied as well as the over-all cycle time, thereby favoring those approaches which are experiencing the greatest traffic occupancy conditions.

In so-called progressive signal systems, i.e. those in which the timing of the signal lights at successive intersections along a main artery is offset or staggered so that a vehicle moving at a predetermined speed will encounter all green signals, it is well-known that the over-all cycle time at any intersection cannot be independently varied in dependence upon traffic conditions at that intersection without seriously affecting the predetermined progression. This should not be taken to mean that the cycle time in such a progressive system is completely non-variable, since it is well-known in the art to vary the cycle time in accordance with the time of day or in accordance with measured traffic conditions. However, in such systems, the cycle time is generally varied simultaneously for all of the signals in the progressive system, and generally only a predetermined number of cycle times is available and the selection of cycle time is in accordance with the time of day or with measured traffic conditions.

Described briefly, the present invention provides a variable cycle split for one or more of the traffic signals in a progressive system without affecting the over-all cycle time. More specifically, it is contemplated by the invention that it will be used primarily in connection with presently existing progressive signalling systems where the cycle time is fixed or is selected from a number of different available values, dependent upon the time of day and thus in accordance with assumed traffic conditions, or dependent upon traffic conditions measured with suitable detectors but will provide for the splitting of the cycle time in accordance with traffic occupancy conditions so as to favor those approaches which are experiencing the greatest congestion. Considering a main highway having a plurality of spaced intersections with a number of side streets, the present invention provides that occupancy conditions will be measured in the vicinity of a selected intersection where it is desired to control cycle split in accordance with vehicle occupancy conditions. Vehicle occupancy is measured for the main highway and also for the intersecting street and the relative values of the measured occupancies control the cycle split at the particular intersection. Alternately, the invention provides for the similar measuremt of vehicle occupancies at each intersection and for the control of the cycle split at each individual intersection in accordance with the relative occupancy values measured for that intersection. At each intersection, the fixed-time controller initiates the green phase for main artery traffic at that intersection, whereas the cycle split computer of this invention determines when such green phase shall end. Because of the fact that the initiation of the green phase is governed by the synchronized controller, there is no interference with the progressive characteristics of the system.

It is an object of this invention to provide a cycle split computer for a fixed time traffic controller so that the relative green times are automatically adjusted in accordance with traffic conditions without varying the over-all cycle time.

It is another object of this invention to provide a system for the control of signals in a progressive signalling system such that the cycle split at each of the intersections may be varied in accordance with traffic occupancy conditions without disturbing the progressive characteristics of the system.

It is another object of this invention to provide a system for the control of the cycle split at an intersection having a high degree of flexibility so as to be readily adaptable to different conditions and thereby be usable in under virtually all circumstances that may be encountered.

Other objects, purposes, and characteristic features of this invention will in part be obvious from the drawings and will in part become clear as the description of the invention progresses.

In describing this invention in detail, reference will be made to the accompanying drawings in which like reference characters designate corresponding parts throughout the several views, and in which:

FIGURE 1 is a diagrammatic illustration of a street layout having a main artery with a plurality of intersecting side streets;

FIGURES 2A, 2B, and 2C graphically illustrate how the present invention provides for the control of the cycle split in a progressive type signaling system without disturbing the progressive characteristics of the system;

Figure 7:
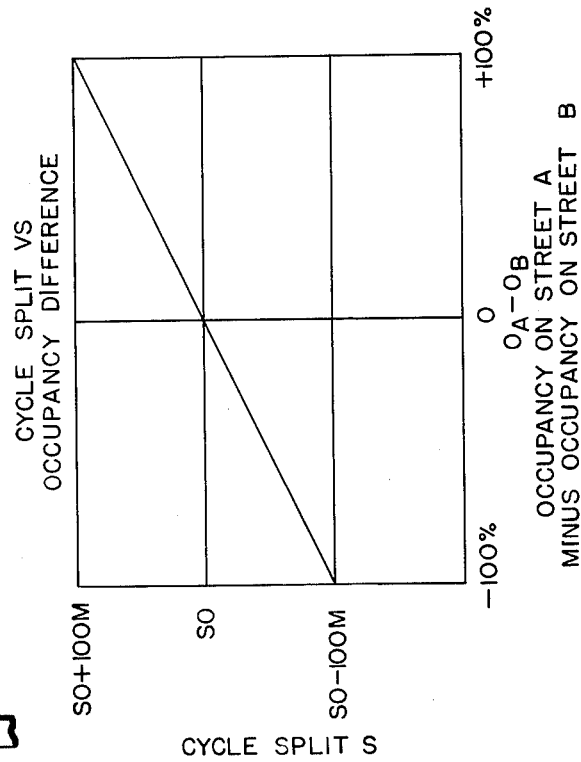
Figure 8B:
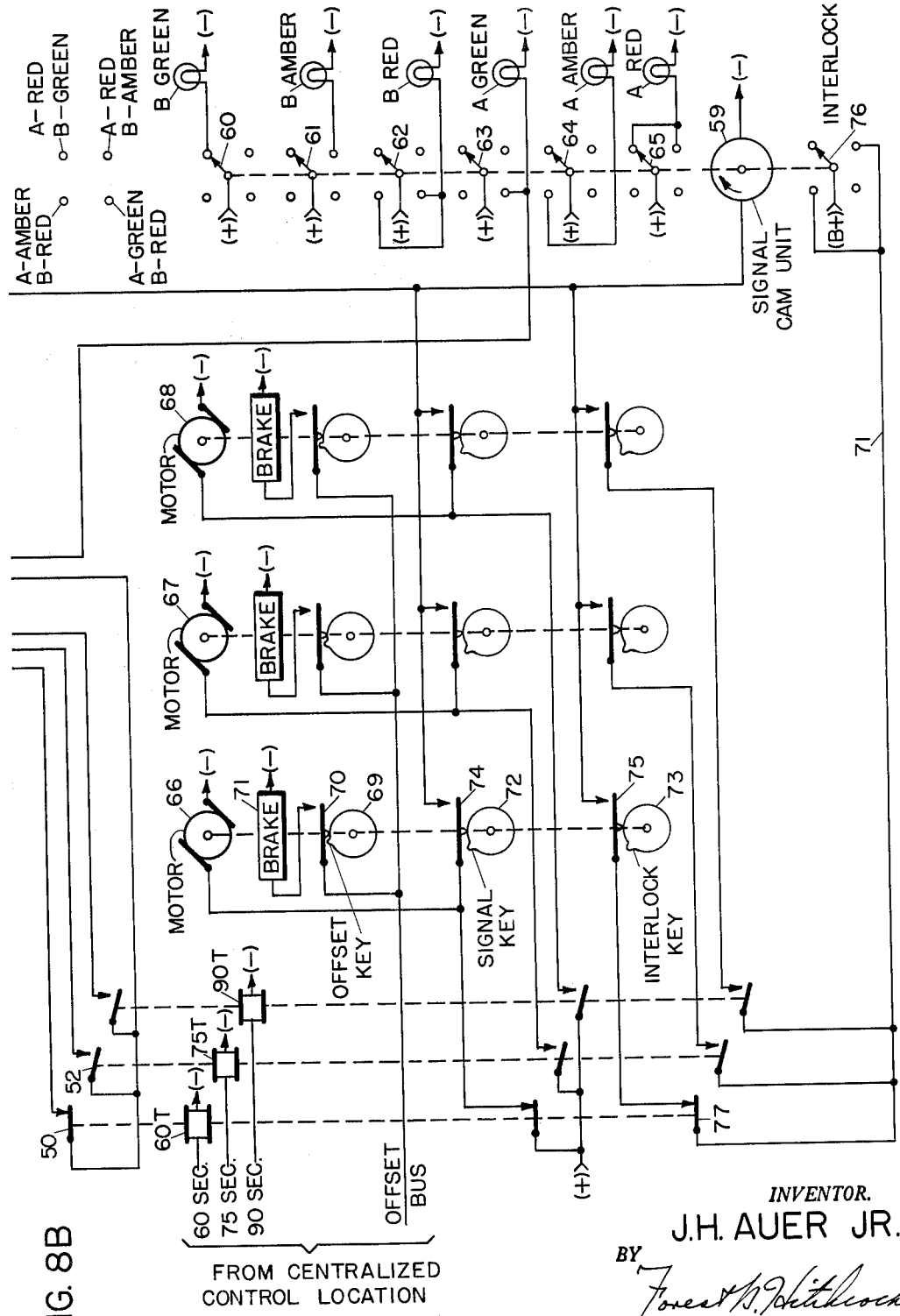

FIGURE 7 graphically illustrates the relationship between cycle split and the measured occupancy for the respective approaches to an intersection, and FIGURES 8A and 8B when joined with FIGURE 8A on top of 8B, constitute a circuit diagram showing the cycle split computer of the present invention and the manner in which it controls a fixed time controller.

GENERAL SYSTEM DESCRIPTION

Described briefly, it is contemplated by this invention to measure traffic congestion on the various approaches to a signal control intersection by means of a vehicle detector which is capable of registering the presence of each vehicle as it passes through a defined detection zone in approach of the controlled intersection. Such a detector provides an output signal for each vehicle whose duration corresponds to the length of time required for the vehicle to pass the detector location. A detector of this kind is preferable to the type of detector which merely counts axles of passing vehicles since the latter kind does not provide a true measure of traffic congestion for reasons already considered. Each detector is mounted considerably in advance of the intersection so that any vehicles waiting for the traffic signal will ordinarily not be stopped within the detection zone since, whenever this happens, the vehicle detector will necessarily indicate maximum highway congestion. With the detector located only three or so car lengths in advance of the intersection, maximum congestion would frequently be recorded at times when there were only a few cars present and erroneous data would then be provided. However, if the vehicle detector is a substantial distance in advance of the intersection, then any queue which forms and results in a vehicle being stopped within the detection zone would properly indicate a high degree of congestion.

The output signal obtained from the vehicle detector does not itself provide a true measure of lane occupancy (i.e., percentage of pavement occupied) but lane occupancy may, nevertheless, be conveniently ascertained therefrom as will be shown. It is further provided by the cycle split computer of this invention that the relative durations of the green phases for the different directions of travel be a function of the occupancies measured for the respective directions of traffic, but without resulting in any variation of the overall cycle time so that the progressive characteristics are not interfered with.

GENERAL SYSTEM LAY-OUT—FIGURE 1

Figure 1:
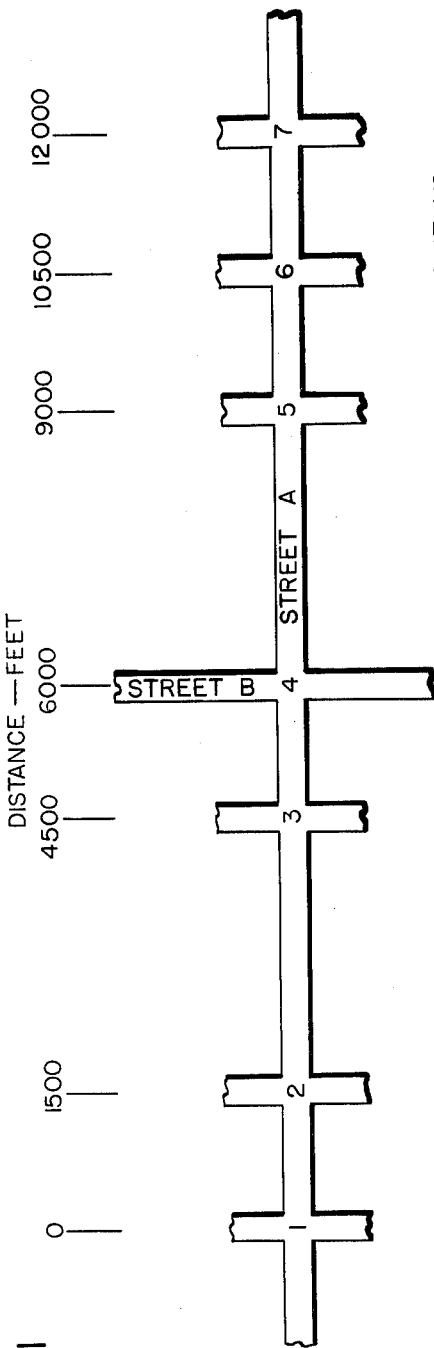

Referring to FIGURE 1, a main artery designated street A is shown, together with a plurality of spaced intersections which it makes with a corresponding number of side streets, the resulting intersections being designated by the numerals 1 through 7, respectively, from left to right on the drawing. The number scale at the top of the drawing designates the location of each of the intersections, being measured in feet of distance from a zero reference point which is taken as the location of intersection 1. It is assumed that the side streets which form intersections 1–3 and 5–7 are relatively minor with respect to the traffic thereon, but street B which forms intersection 4 with the main artery, street A, is assumed to be a street which carries a relatively large amount of traffic which may be highly variable in its nature so that a system which adjusts the relative green times for street A and street B in accordance with their relative occupancies will tend to expedite traffic flow considerably.

DESCRIPTION OF TIMING DIAGRAM—FIGURES 2A–2C

FIGURE 2A graphically illustrates the timing of the signal lights at the various intersections 1–7 so as to provide signal progression, whereby a vehicle travelling in either direction along street A will be able to encounter a green signal at each of the various intersections 1 through 7. As is well-known in the art, such a system results in the formation of successive groups or "platoons" of vehicles which travel generally together along street A and with each platoon encountering a green signal at each of the intersections. In FIGURE 2A, the dotted line extending from the upper left downwardly to the lower right designates the progress of a vehicle travelling along street A in the direction from intersection 1 to intersection 7 and travelling at the predetermined speed of 34 m.p.h. This velocity determines the slope of the line since horizontal distance represents time in seconds travelled from the initial position, whereas the vertical ordinate represents distance. The dashed horizontal lines, each bearing a respective numeral 1 through 7, designate the location of each of the corresponding intersections 1 through 7 shown in FIGURE 1. With respect to each dashed horizontal line, each dash represents the time throughout which the respective signal displays a green aspect to A street traffic. Thus, for the vehicle indicated as travelling along street A from intersection 1 to intersection 7, once this vehicle encounters a green light at intersection 1, this same vehicle will encounter a green signal at every one of the intersections 1 through 7 by reason of the progressive offset occurring at the successive intersections. More specifically, as shown in FIGURE 2A, upon the intersection of the downwardly sloping line representing the travelling car with the horizontal line representing the location of intersection 2, it is shown that the green time of the signal at intersection 2 begins exactly at the time of arrival of the car at that intersection. Each of the remaining intersections 3 through 7 has the green time of its respective signal offset by the proper amount to ensure that the green time for that signal will just be starting when the vehicle in question arrives at that intersection. Similarly, the dotted line which slopes upwardly from left to right in FIGURE 2A and thereby representing a vehicle travelling in the opposite direction of street A, i.e., from intersection 7 to intersection 1, also encounters a green signal at each of the respective intersections since the offset times for the different signals are all so arranged that the signal will just be starting its green time when the vehicle arrives at the respective intersection.

Many traffic control systems are arranged to operate in the general manner indicated by FIGURE 2A, and their timing remains constant irrespective of variations in traffic conditions. Although such a system has many advantages, it is quite inflexible since it provides fixed green times for both A and B streets even though relative traffic condition on these two streets may be highly variable.

FIGURES 2B and 2C illustrate how the cycle split computer of the present invention can be used to vary the cycle split without affecting the cycle duration, and, therefore, without affecting the progression. FIGURE 2B illustrates the conditions which exist when the traffic on street A is considerably heavier than that on street B. Under these circumstances, the cycle split is automatically adjusted so that the relative green time for street A at each of the intersections is made substantially longer than the green time for street B. As previously mentioned, occupancy conditions of streets A and B are measured at the approaches to intersection 4, and the resulting data is used to adjust the cycle split at intersection 4 only. This is illustrated in FIGURE 2B by showing that the duration of the green times at each of the intersections for traffic on street A is the same as that shown for the corresponding intersection in FIGURE 2A, with the exception of intersection 4 where the green time is now a very substantial portion of the overall cycle while the green time for street B is made quite short. However, it is important to note in FIGURE 2B that vehicles tarvelling along street A will encounter a green signal upon their arrival at intersection 4 and the reason for this is that the green time for street A at intersection 4 still starts at the same time that it did for the assumed conditions in FIGURE 2A. In other words, the green time for phase A is appreciably lengthened but the beginning of the green phase A is still timed to occur with the required offset which will result in its displaying a green signal for vehicles travelling in either direction with the predetermined velocity.

FIGURE 2C, on the other hand, illustrates the conditions which are produced by use of the apparatus of this invention under those circumstances where vehicle occupancy on street B is appreciably higher than that on street A. Under these circumstances, the green phase displayed at intersection 4 for street A traffic is very much reduced, thereby allowing a considerably longer green time for traffic moving on street B. Again, the time of beginning of the green phase for street A has not been disturbed, and there is thus no interference with the proper progression except to the extent that there is now a substantially smaller latitude permitted in time of arrival of street A traffic at intersection 4 in order to encounter a green signal.

In both FIGURES 2B and 2C, it has been shown that the measure of vehicle occupancies at the different approaches at intersection 4 has been used only for the purpose of controlling the cycle split at intersection 4. However, it is readily apparent that the vehicle detectors at intersection 4 may also be connected to another one or more cycle split computers each provided for a respective intersection so as to control the cycle split at that intersection. This is a practical arrangement where conditions at one intersection, such as intersection 4, are typical of those which exist at the other intersections.

Alternatively, a separate cycle split computer may be provided for each of the intersections 1 through 7, with each such computer affecting the cycle split for the respective intersection in the same manner as indicated for intersection 4. The latter system is, of course, preferable from the standpoint of system operation in that it permits the cycle split at each intersection to be controlled in accordance with the traffic congestion on street A relative to the congestion on the particular side street involved. The disadvantage of this is that such a system is naturally more expensive since it requires that detectors be provided at each intersection.

Many times conditions arise where traffic on most of the side streets is not greatly variable and can be readily handled at the corresponding intersections by providing a fixed minimum green time for such side street traffic, but where there also are one or two side streets intersecting the main artery which handle greatly variable amounts of traffic. Under such conditions, it is desirable to provide a cycle split computer at only those intersections having these highly variable conditions and to control the cycle split only at these particular intersections, while leaving the others with the fixed cycle split.

SYSTEM BLOCK DIAGRAM—FIGURE 3

Figure 3:
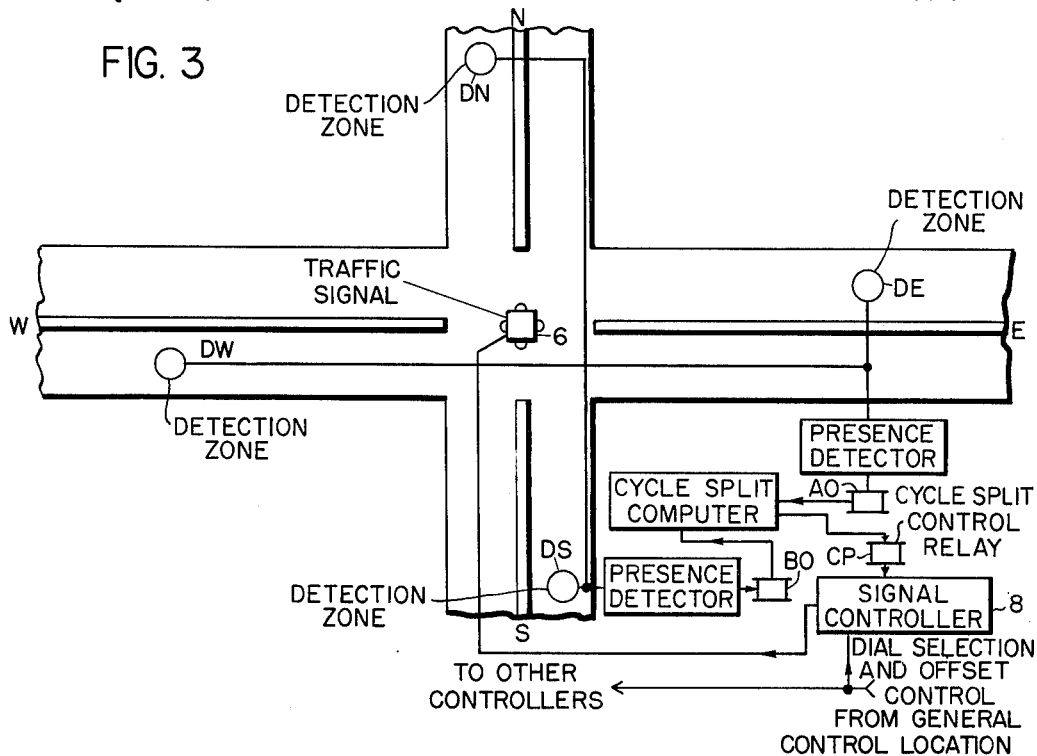
FIGURE 3 is a diagrammatic illustration showing the occupancy detectors which are employed at an intersection and illustrating further the computer of the present invention and its relation to the signal controller.

FIGURE 3 illustrates a typical intersection such as intersection 4 of FIGURE 1. It is assumed that there is two-way traffic on each street and that traffic in the respective directions is controlled by a traffic signal 6 which is shown positioned in the center of the intersection, although multiple signals may be placed upon the various corners as well. For each of the approaches goverened by signal 6, there is a detector head such as the detector DE associated with the east approach lane and comprising both transmitting and receiving transducers which define a detection zone over the lane or lanes of the east approach which is traversed by each vehicle approaching the intersection. Both detector heads DE and DW are connected to the same detector chassis DWE which includes therein the apparatus shown in block diagram form in FIGURE 5. A similar detector chassis DNS is connected to detector heads DN and DS which define respective detection zones on the North and South approaches.

VEHICLE PRESENCE DETECTOR—
FIGURES 4A, 4B AND 5

Figure 4A:
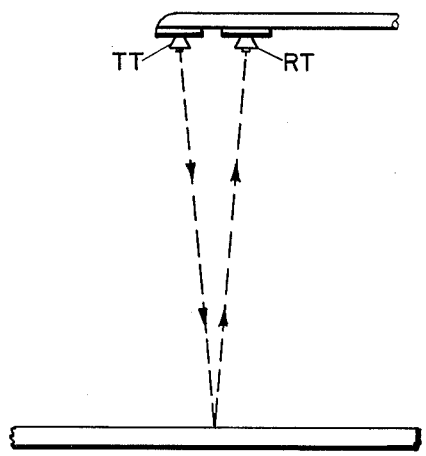
FIGURES 4A and 4B illustrate diagrammatically how vehicle detection is effected through the use of electro-accoustic transducers.
Figure 4B:
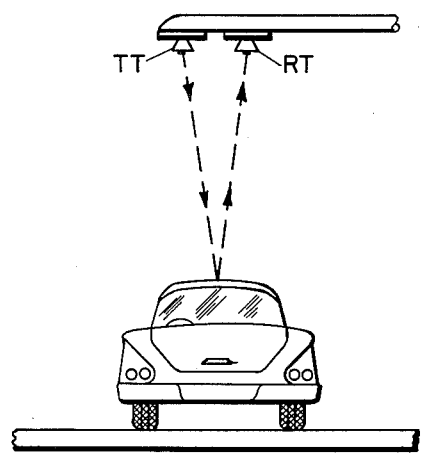

The vehicle presence detector may be of the type disclosed in the prior copending applications Serial No. 808,736 and 820,325, already referred to. In both such prior applications, the vehicle detector is disclosed as one in which a beam of energy is transmitted across the path of each vehicle so that it impinges upon such vehicle and is reflected therefrom back toward a receiving transducer for as long as it takes the vehicle to pass through the beam. Preferably, in practice, the beam of energy is a beam of sonic energy which is directed downwardly so that it normally impinges upon the pavement as shown in FIGURE 4A but impinges instead upon a vehicle within the detection zone as shown in FIGURE 4B. It is assumed for the purposes of illustration in FIGURE 3 that the detector is of this latter type so that a generally circular zone is defined. If there are two or more adjacent lanes to be monitored, the detection zone can be made broader so that a vehicle approaching the intersection and travelling in either of the adjacent lanes will have its presence detected.

Figure 5:
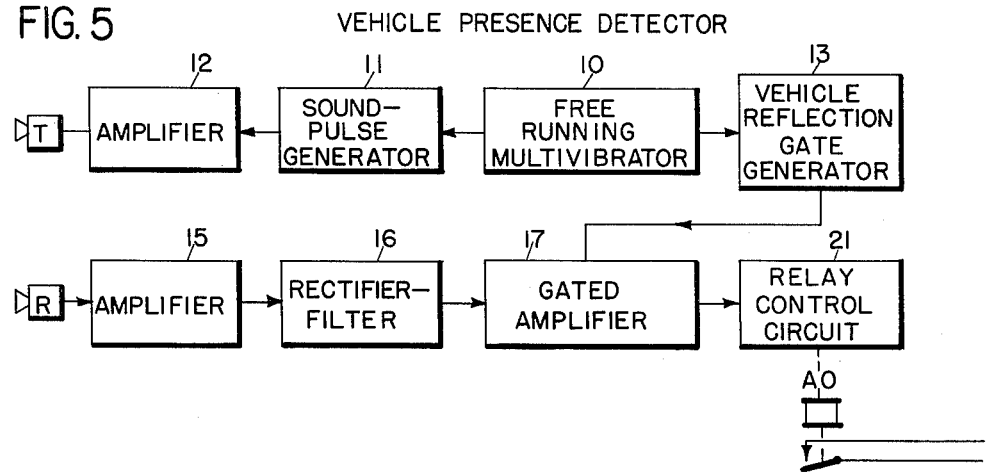
FIGURE 5 is a block diagram of a vehicle presence detector of the kind which may be used to measure vehicle occupancy.

The vehicle detector of FIGURE 5 employs sound energy which is transmitted in the form of discrete pulses. The apparatus provided for generating the repetitive sound pulses comprises a free-running multivibrator 10 whose frequency of operation establishes the pulse repetition rate. For each cycle of its operation, multivibrator 10 applies a triggering pulse to the sound pulse generator 11. The generator 11 then produces a brief pulse of ultrasonic frequency energy which is amplified by amplifier 12 and applied to the transmitting transducer T.

Each reflection pulse impinging upon receiving transducer R is amplified by amplifier 15 and rectified and filtered by rectifier-filter 16 so that a voltage pulse is applied to gated amplifier 17 for each such reflection pulse. At the same time, each trigger pulse from multivibrator 10 initiates a timing operation in vehicle reflection gate generator 13 which then demarcates an interval encompassing the expected reception time of a vehicle reflection pulse but not a pavement reflection pulse. The gating signal is applied as an enabling input to gated amplifier 17 so that an output pulse is applied to relay control circuit 21 for each received vehicle reflection pulse only. When a predetermined number of such pulses have been applied to relay control circuit 21 in close succession, relay AO is picked up. Since more than one pair of transmitting-receiving transducers may be connected in parallel, relay AO will pick up provided there is a vehicle occupying any of the detection zones defined by any such pair.

The output of each of the several detectors monitoring traffic flow toward intersection 4 is applied to the cycle split computer 7 shown in detail in FIGURES 8A and 8B. The function of this computer 7, whose operation will be described in detail, is to determine cycle split for the respective phases of signal 6. The output of computer 7 is applied to signal controller 8 whose output, in turn, directly controls the signal 6. As is customary in a progressive signal system, the signal controllers at each of the intersections are connected by means of a line circuit to a central office to effect the desired synchronism and thereby make possible the signal progression along the main artery.

SIMPLIFIED CIRCUIT DIAGRAM—FIGURE 6

Figure 6:
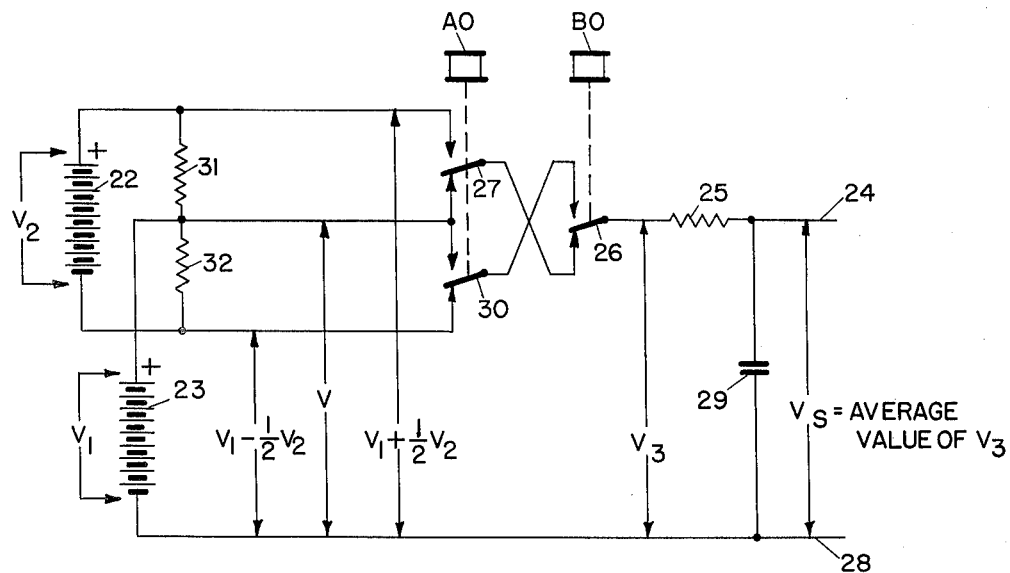
FIGURE 6 is a diagrammatic illustration which demonstrates the manner in which the occupancy measurements for the different approaches to an intersection are utilized in the cycle split computer of the present invention to determine the desired cycle split.

FIGURE 6 is a circuit diagram showing the manner in which the occupancy detectors for the respective intersecting streets provide a voltage analog which is a measure of the desired cycle split. In FIGURE 6, relay AO is controlled by the vehicle detector associated with the transducers mounted along the approaches to intersection 4 on street A of FIGURE 1, while relay BO is the corresponding detector for street B. From the description already given, it will be apparent that relays AO and BO are normally dropped away but that relay AO is picked up whenever a vehicle is within the detection zone defined by either of the detector heads positioned alongside the approaches to intersection 4 on street A and that relay BO is picked up whenever a vehicle similarly occupies the detection zones on street B.

The circuit shown in FIGURE 6 provides a means for comparing the vehicle occupancies on streets A and B to derive therefrom an analog which is a function of the relative occupancies and may, therefore, be used to control the cycle split at that intersection. This circuit is organized in such a manner as to facilitate the description of the invention; a more practical circuit providing the same functions will later be disclosed and described.

Two batteries are shown, one battery 22 supplying the voltage $V_2$ and the other battery 23 supplying the voltage $V_1$. Under normal conditions wherein both relays AO and BO are dropped away, terminal 24 is connected through resistor 25, through back contact 26 of relay BO and back contact 27 of relay AO to the positive terminal of battery 23. Terminal 28 is at all times connected to the negative terminal of battery 23. Under these circumstances, the voltage appearing at the input to the filter comprising resistor 25 and capacitor 29, i.e., voltage $V_3$, is simply the voltage $V_1$ supplied by battery 23. The time constant of resistor 25 and capacitor 29 is quite long so that the voltage appearing between terminals 24 and 28 cannot vary abruptly and thereby rapidly follow the variations in voltage $V_3$ resulting from the operations of the contacts 26, 27 and 30 of relays AO and BO. Instead, the filter output voltage $V_S$ represents the time average of voltage $V_3$.

Whenever a vehicle occupies either of the detection zones associated with the detector which is monitoring traffic on street A, relay AO is picked up and this causes the left-hand terminal of resistor 25 to be connected through back contact 26 of relay BO and front contact 27 of relay AO and resistor 31 to the positive terminal of battery 23. Since resistors 31 and 32, connected in series across battery 22 have identical values of resistance, the voltage appearing across resistor 31 is one-half that of battery 22, or $V_2/2$. This is added to the voltage $V_1$ provided by battery 23 so that voltage $V_3$ then is $V_1+V_2/2$.

When there is a vehicle detected by the detector for street B traffic but no detection of a vehicle by the street A detector so that relay BO is picked up but relay AO is dropped away, the left-hand terminal of resistor 25 is connected through front contact 26 of relay BO, back contact 30 of relay AO, and through resistor 32 to the positive terminal of battery 23. Because of the polarity of the voltage across resistor 32, voltage $V_3$ then is the voltage of battery 23 minus the voltage across resistor 32, or $V_1-V_2/2$.

When vehicles are concurrently detected by both the A and B street vehicle detectors so that both relays AO and BO are picked up at the same time, the left-hand terminal of resistor 25 is connected through front contacts 26 and 30 to the positive terminal of battery 23 so that the voltage $V_3$ then is $V_1$.

As already stated, the voltage appearing between terminals 24 and 28 is the average of $V_3$. If:

$t_1$ is the sum of the time intervals during any measuring interval T throughout which relay AO is dropped away and relay BO is picked up;

$t_2$ is the sum of the time intervals during time T throughout which relays AO and BO are either both dropped away or both picked up;

$t_3$ is the sum of the time interval during time T throughout which relay AO is picked up and relay BO is dropped away; and then:

$$V_s = \left(V_1 - \frac{V_2}{2}\right)\frac{t_1}{T} + V_1\frac{t_2}{T} + \left(V_1 + \frac{V_2}{2}\right)\frac{t_3}{T} \quad (1)$$

$$= V_1\left(\frac{t_1+t_2+t_3}{T}\right) + \frac{V_2}{2}\left(\frac{t_3-t_1}{T}\right) \quad (2)$$

$$= V_1 + \frac{V_2}{2}\left(\frac{t_3-t_1}{T}\right) \quad (3)$$

As already defined, $t_3$ is the time throughout which relay AO is up and relay BO is down, and this time may thus be represented as follows:

$$t_3 = t_{A\uparrow B\downarrow} \quad (4)$$

Similarly, $t_1$ has been defined as the time throughout which relay AO is down and relay BO is up, and this may be represented as follows:

$$t_1 = t_{A\downarrow B\uparrow} \quad (5)$$

The total time throughout which relay AO is picked up may be represented as being the sum of the time throughout which relay AO is picked up while relay BO is dropped away together with the time throughout which relay AO is picked up and relay BO is also picked up. Thus, $$t_{A\uparrow} = t_{A\uparrow B\downarrow} + t_{A\uparrow B\uparrow} \quad (6)$$

Similarly, $$t_{B\uparrow} = t_{A\uparrow B\uparrow} + t_{A\downarrow B\uparrow} \quad (7)$$

From Equations 4, 5, 6 and 7:

$$t_3 = t_{A\uparrow B\downarrow} = t_{A\uparrow} - t_{A\uparrow B\uparrow} \quad (8)$$

$$t_1 = t_{A\downarrow B\uparrow} = t_{B\uparrow} - t_{A\uparrow B\uparrow} \quad (9)$$

Substituting these values for $t_3$ and $t_1$ in Equation 3, it follows that:

$$V_s = V_1 + \frac{V_2}{2} \frac{(t_{A\uparrow} - t_{A\uparrow B\uparrow} - t_{B\uparrow} + t_{A\uparrow B\uparrow})}{T} \quad (10)$$

$$= V_1 + \frac{V_2}{2} \frac{(t_{A\uparrow} - t_{B\uparrow})}{T} \quad (11)$$

However:

$$\frac{t_B}{T} = \frac{O_A}{100} \quad (12)$$

$$\frac{t_B}{T} = \frac{O_B}{100} \quad (13)$$

where $O_A$ and $O_B$ are, to a close approximation, the lane occupancies of streets A and B respectively expressed as percentage where occupancy is defined as the percentage of pavement which is occupied by vehicles. This relationship between the percentage of contacts closure time of the detector relay to lane occupancy is derived in the aforementioned patent application S.N. 133,616.

When Equations 12 and 13 are substituted in Equation 11 the following expression for $V_s$ is obtained:

$$V_s = V_1 + \frac{V_2}{200}(O_A - B) \quad (14)$$

Equation 14 shows the close relationship that exists between $V_s$ and the relative occupancy conditions on streets A and B. As will be shown in the following analysis, $V_s$ may be used as an analog representative of the desired cycle split.

$V_s$, which, it will be remembered, is the average voltage obtained at the output terminals of the circuit of FIGURE 6 may be applied to a linear time generator to generate a time $t_s$ (the A street green time) such that $$t_s = KV_s \quad (15)$$

where K is a constant.

If the total time representing a complete signal cycle is taken as $t_c$, then the value of $V_s$ which is required to make $t_s$ equal to $tC$ is $V_C$ and:

$$t_c = KV_c \quad (16)$$

and $$\frac{t_s}{t_c} = \frac{V_s}{V_c} \quad (17)$$

As the green time which is alloted to street A is $t_s$ as already stated, then the cycle split S which is the percentage of the total cycle time alloted to green time for street A, is $$S = 100\frac{t_s}{t_c} = 100\frac{V_s}{V_c} \quad (18)$$

By substituting Equation 14 in Equation 18, there is obtained the following expression for the cycle split S:

$$S = 100\frac{V_1}{V_c} + \frac{V_2}{2V_c}(O_A - O_B) \quad (19)$$

By letting $$100\frac{V_1}{V_c} = S_0 \quad (20)$$

and $$\frac{V_2}{2V_c} = M \quad (21)$$

then $$S = S_0 + M(O_A - O_B) \quad (22)$$

Equation 22 shows that the value $S_0$ is the value of the cycle split when the occupancies on the two streets A and B are equal and is not necessarily 50% since it may be necessary to provide a longer green time to one street than the other even when their vehicle occupancies are equal. In FIGURE 7, the relationship between S, the dependent variable is plotted against $(O_A - O_B)$ as the independent variable. M is the slope and reflects the weight shift in relation occupancy values in affecting the cycle split. For example, if it is desired to have a split of 60% when the two streets have equal occupancies and a split of 80% when the occupancy on street A is 20% greater than that on street B, i.e., $O_A - O_B = 20\%$, then:

$$S_0 = 60 = 100\frac{V_1}{V_c} \quad (23)$$

$$M = 80 - 60 = 1 = \frac{V_2}{2V_c} \quad (24)$$

$$S = 60\% + 1(O_A - O_B) \quad (25)$$

Also, from Equations 23 and 24

$$V_1 = 0.6V_c \quad (26)$$

$$V_2 = 2V_c \quad (27)$$

In general, any desired values of $S_0$ and M may be obtained by letting $$V_1 = \frac{S_0}{100}V_c \quad (28)$$

$$V_2 = 2MV_c \quad (29)$$

CYCLE SPLIT COMPUTER—FIGURES 8A AND 8B

FIGURES 8A and 8B illustrate a circuit of a practical form of cycle split computer. A circuit which is functionally the equivalent of that shown in FIGURE 6 is provided by the potentiometers 34, 35, 36, 37 which, together with the series resistors 38 and 39 are connected in series between the (B+) terminal and ground. The movable taps on the potentiometers 34 and 37 together comprise the $S_0$ control and both taps move in the direction of the associated arrows when the single control knob for the two ganged potentiometers is turned in the clockwise direction. The movable taps on the potenciometers 35 and 36, one of which moves upwardly and the other downwardly upon rotation of the associated control knob, comprise the M control.

Relays AO and BO are provided with contacts 26, 27 and 30 to correspond to those shown in FIGURE 6, and the heel of contact 26 is connected, as in FIGURE 6, through resistor 25 and capacitor 29 to the control grid of a triode tube T1.

When the $S_0$ control knob is rotated clockwise so that the movable taps on potentiometers 34 and 37 both move downwardly in FIGURE 8A, the effective resistance provided by potentiometer 34 is decreased while the effective resistance provided by potentiometer 37 is then correspondingly increased. This has the effect of increasing all of the potentials at the various movable taps by equal amounts. The effect, therefore, is the same as an increase of the potential $V_1$ supplied by battery 23 in FIGURE 6.

Thus, an Equation 28 shows, this control may be set to vary $V_1$ in accordance with the desired value of $S_o$.

The M control is so arranged that a clockwise rotation increases the available voltage between the taps on potentiometers 35 and 36 respectively with respect to the voltage at the junction of these potentiometers. Therefore, the effect is to increase the voltage which is added or subtracted from that which appears at the junction of these potentiometers and this has the same effect, therefore, as a variation in the voltage $V_2$ provided by battery 22 in FIGURE 6.

The filtered average voltage $V_s$ is applied to the control grid of cathode follower tube T1 whose cathode is connected through resistor 40 to the tap on potentiometer 41 which is connected in series with resistors 42 and 43 between the (B+) terminal and ground. The control grid is also connected to the plate of triode tube T2. The cathode of tube T2 is connected to a controllable positive voltage appearing at the variable tap on potentiometer 44 which is connected in series with resistors 45 and 46 between (B+) and ground.

When the amplitude of $V_s$ falls to such a low value that the resulting cathode potential of tube T1 would ordinarily tend to go below some predetermined value established by the setting of potentiometer 41, tube T1 will cut off, and this prevents the cathode voltage of tube T1 from going below that minimum value. Adjustment of the tap on potentiometer 41 thereby provides a means for setting the minimum amplitude of the $V_s$ voltage at the cathode of tube T1. The selection of a minimum value of $V_s$ ensures that the cycle split will still have some minimum predetermined finite value even when A street occupancy is for less than B street occupancy.

When the voltage at the control grid of tube T1 attempts to rise above that which is applied to the cathode of tube T2, this tube conducts, thereby preventing the voltage at the grid of tube T1 from substantially exceeding the amplitude of voltage at the cathode of tube T2. Thus, the setting of potentiometer 44 determines the maximum value of $V_s$ and thus the maximum value of the cycle split. This control over the cycle split has been found to be necessary since, even under those conditions where the A street occupancy is very much greater than that on the B street, it is still desirable to provide some minimum B street green time and this is controllable by setting the maximum value of the $V_s$ tube obtained at the cathode of tube T1.

As will subsequently be described when the operation of the fixed time controller of FIGURE 8B is undertaken, relay AP which is the A street green repeater relay is energized at the beginning of the green phase for street A. At such time, capacitor 47 which has been fully discharged until that time by reason of the shunt provided therefor through back contact 48 of relay AP, is then connected through this front contact 48 to the cathode of tube T1 so that the voltage on the cathode of T3 is suddenly raised by an amount equal to the then available $V_s$ voltage plus tube T1 bias minus the residual voltage at T3 cathode prior to the picking of contact 48. Therefore, the amount by which the cathode voltage of tube T3 is raised when relay AP picks up and closes its front contact 48 is the $V_s$ voltage less a constant voltage C.

At the instant that relay AP picks up, the sudden increase in cathode voltage of tube T3 causes this tube to cut off immediately. Thereafter, the cathode voltage of tube T3 decreases linearly since a constant cathode current flows through the plate-cathode circuit of tube T4. The plate-cathode current of tube T4 is substantially constant because of the very large cathode resistance 49 provided for this tube and by the fact that its control grid voltage is maintained at a constant value by a voltage divider in a manner to be presently described. Because of this, the length of time during which tube T3 remains non-conductive following the picking up of relay AP is almost directly proportional to the amplitude of $(V_s-C)$. Because of the presence of this constant voltage C, Equation 28, previously presented, is modified for the practical circuit of FIGURE 8 to the following:

$$V_1 = C + \frac{S_o}{100} V_o$$

As will shortly be described, the signal controller illustrated in FIGURE 8B can be remotely controlled to operate on a selected one of a plurality of cycle times dependent upon traffic conditions. FIGURE 8B shows three relays 60T, 75T and 90T, and a selected one of these is energized at any time from the central control location over the line circuit (see FIGURE 3) connecting the controller to the central location. When relay 60T is energized, the controller operates on a 60-second cycle, and this is the cycle length that may be selected when traffic congestion is relatively light. When traffic becomes heavier, relay 75T may instead be energized and this causes the cycle length of the controller to be extended to 75 seconds. The cycle length may be extended to 90 seconds in a similar manner by merely energizing relay 90T.

From the foregoing mathematical presentation, it is evident that a particular value of $V_s$ voltage can represent a corresponding value of cycle split only because $V_c$ is proportional to the predetermined cycle time $t_c$. If a different cycle time is selected, the relationship is not maintained unless adequate compensation therefor is made. The amplitude of $V_s$ determines the length of time that tube T3 will remain non-conductive following the picking up of relay AP and this, in turn, determines the duration of the green phase for street A. From this, it follows that when the total cycle time is increased, as from 60 to 75 seconds, one way in which the required compensation can be made is to slow the rate of charge of capacitor 47 so that the particular value of $V_s$ which is then available will produce the same cycle split with respect to the now longer cycle time that it did before. This is accomplished by selecting the control grid voltage of tube T4 in accordance with the particular cycle time then effective. More specifically, if relay 60T is energized as shown in FIGURE 8B, front contact 50 of this relay is closed and this connects the control grid of tube T4 through this front contact 50 to the tap of potentiometer 51. If a longer cycle time is selected by picking up relay 75T, the control grid of tube T4 is connected through front contact 52 of relay 75T to the tap on potentiometer 53 and this potentiometer is then adjusted to provide a more negative grid voltage for tube T4 so as to reduce the amplitude of constant current provided by tube T4 and thereby permit the particular value of $V_s$ then effective to produce the same proportionate amount of green time for street A in the longer total cycle time now available as it did previously when the shorter total cycle time existed. In this manner, the relationship between volts available at $V_s$ and cycle split S is made independent of the cycle length and it then becomes possible to calibrate the dials for the $S_o$, S Min. and S Max. controls directly in terms of cycle split and to calibrate the M control in terms of cycle split versus occupancy difference for the A and B streets.

Tubes T5 and T6 are interconnected to operate as a Schmitt trigger circuit with tube T6 being normally conductive so that the A street green time relay AG is normally picked up. Tube T5 is normally cut off because its control grid is connected to the plate of tube T3 which is conductive except during the A street green time and, therefore, has a low plate voltage which maintains tube T5 in the cut-off condition.

When relay AP picks up and thereby causes tube T3 to be cut off as already described, the grid voltage applied to tube T5 abruptly rises in amplitude and this causes tube T6 to become non-conductive so that relay AG drops away. When capacitor 47 has discharged to the point where tube T3 again starts to conduct so that its plate voltage is lowered, thereby causing a reversal of the condition of the Schmitt trigger, relay AG is restored to its picked-up condition. Because of this, capacitor 54 which was charged to the (B+) voltage at the time that relay AG was dropped away, is now connected in series with the winding of the A street amber time relay AAT. This latter relay immediately picks up and closes its front contact 55 and the pulse of current that then occurs as capacitor 56 charges provides a momentary energization of the controller pulse relay CP. This relay remains picked up only for a quite brief instant since the current through its winding rapidly drops to zero as capacitor 56 becomes charged. However, the momentary picking up of relay CP and the resultant closure of its front contact 57 causes energy to be applied for a brief time over wire 58 to the signal cam unit 59 of the controller shown in FIGURE 8B. This causes the cam unit to be actuated to its next step in which the A street signal ceases to display a green aspect and now displays an amber aspect.

Referring now to the fixed-time controller shown in FIGURE 8B, each pulse of energy applied to wire 58 actuates the signal cam unit 59 so as to operate each of the various contacts 60–65 one step in the clockwise direction. The signal cam unit is shown in FIGURE 8B in the condition which results in the display of a green aspect for street B traffic and a red aspect for street A traffic. Thus, contact 60 is in the position where the lamp designated B Green is illuminated and contact 65 is in the position where the lamp designated A Red is illuminated. A single pulse of energy on wire 58 resulting in a single actuation of cam unit 59 moves contact 61 to the position where the B Amber lamp is illuminated, but contact 65 in its new position still maintains the A Red lamp illuminated. Upon the application of a further control pulse to the signal cam unit 59, contact 62 closes a circuit to illuminate the B Red lamp, whereas contact 63 then energizes the A Green lamp. Successive input pulses operate the contacts 60–65 through their various positions and result in the well-known sequence of signal aspects displayed by the signal lights at the intersection.

It has already been described how relay AAT is energized by charged capacitor 54 upon the dropping away of relay AG.

The length of time that relay AAT remains picked up is dependent upon the time constant for the discharging of capacitor 54. Since an amber time of approximately three seconds is often employed, this time constant is made such that relay AAT will remain picked up for approximately that amount of time. Thus, after three seconds, relay AAT drops away, and its back contact 55 closes to complete a discharge circuit by means of which the now fully charged capacitor 56 can discharge through the winding of relay CP to pick this relay up again momentarily. Contact 57 closes to thereby apply a further pulse to the signal cam unit 59, thereby advancing the various contacts 60–65 one further step in a manner already described so that they now are in the positions shown in FIGURE 8B. As a result, signal 6 then displays a red signal to A street traffic and a green signal to B street traffic.

The signal controller diagrammatically illustrated in FIGURE 8B is a typical 3-dial controller whose construction and mode of operation is well-known in the prior art. Dependent upon which of the relays 60T, 75T or 90T which is energized at any time, energy is applied to a respective one of the motors 66, 67 or 68, each of which rotates with a different angular velocity, the motor 66, for example, making one complete revolution each 60 seconds and motor 67, similarly, making one revolution each 75 seconds. Associated with the motor 66 are three dials, each of which is vertically aligned with motors 66 in FIGURE 8B and rotates with the same angular velocity as the motor. The uppermost of the dials, dial 69, is provided with an offset key which comes into contact with the movable spring contact 70 once each revolution, thereby causing energy to be applied from the offset bus and through closed contact 70 to the brake 71. When energized, brake 71 prevents rotation of each of the dials 69, 72 and 73. The manner in which dial 69, its associated offset key, contact 70, and brake 71, together with the controlled energization of the offset bus all cooperate to effect the desired synchronism between the various controllers in a synchronized progressive signal system is familiar to those skilled in the art and need not be described in detail here. It is deemed sufficient to point out that the location of the offset key about the periphery of dial 73 determines the offset of this particular controller as compared to all the other controllers which are similarly controlled through the same offset bus.

The next dial controlled by motor 66 is dial 72 which bears the signal key and which, once each revolution, closes contact 74. When this happens, energy is applied to the signal cam unit 59 to advance it one step. As will subsequently become clear, this causes the contacts 60–65 to operate to the A Red–B Amber position.

Approximately three seconds later, the interlock key on dial 73 moves into a position where it can effect closure of contact 75. At this time, the interlock contact 76 driven by signal cam unit 59 is in a position where it can apply energy from (B+) to wire 71. This is applied through closed contact 77 and through momentarily closed contact 75 to signal cam unit 59. Therefore, after three seconds have elapsed during which the A Red–B Amber signal has been displayed, a further pulse of energy is applied to the signal cam unit 59 to advance all of the associated contacts to the next position, the A Green–B Red position. As soon as this occurs, the A street green repeater AP is energized through contact 63, and this initiates the timing action whereby the value of voltage $V_s$ determines the duration of the A street green phase. At the end of the A street green phase, the signal cam unit is stepped once to the A Amber–B Red position and three seconds later to the A Red–BB Green position again, and both these latter two operating steps are produced by the cycle split computer of this invention in the manner already described.

It is important to note that the cycle split computer of this invention is adapted for use with a standard fixed-time controller, a typical one of which has been shown in FIGURE 8B. Substantially the only modifications which need be made to the controller are the removal of all keys from dials 72 and 73 other than those shown in FIGURE 8B since the remainder of the timing functions are accomplished by the cycle split computer, and the adjustment of the interlock cam of the signal cam unit as shown in FIGURE 8B.

From the description already given, it will be apparent that a similar mode of operation will result if a different cycle time is selected as a result of the actuation of a different one of the relays such as the relays 75T or the relay 90T, for example. This selection of cycle times is made in an obvious manner by the line circuit which connects all of the various controllers in the progressive signalling system.

A failure of the cycle split computer merely results in the inability thereafter to pick up the controller pulse relay CP which supplies the short actuating pulses to the signal cam unit 59. However, this does not result in a complete breakdown of the system since the signal will then operate with a 50% cycle split, with the length of the green phase for each street equally the time of revolution of the associated dial in the controller. For example, assuming that the 60-second dial has been selected by the picking up of relay 60T, each closure of contact 74 by dial 72 will initiate an amber period for one of the signals. Approximately three second later, the interlock key will close and will initiate a green period on one or the other of the A and B streets. On the next revolution, the other signal will receive an amber period and the other direction of traffic will then receive a green signal. Although the cycle time is thus doubled, the system will, nevertheless, continue to cycle, and this condition is much to be preferred over the condition where a failure results in a complete failure of the system to cycle. It is not possible for the system to so operate that there will be long amber periods and short green periods since the interlock contact 76 controlled by the signal cam unit 59 prevents the interlock key on dial 73 from initiating an amber period. Thus, if the computer should fail after delivering but one pulse terminating the A Green–B Red period and initiating the A Amber–B Red period, this condition will persist until the signal key moves the signal cam unit to A Red and B Green. The subsequent operation of the interlock key will be ineffective, but from then on, the signal key will initiate amber signals and the interlock key will initiate green signals on a 120-second cycle.

Having described a cycle split computer for a progressive signal system as one preferred embodiment of the present invention, I desire it to be understood that various modifications, adaptations and alterations may be made to the specific form shown without in any way departing from the spirit or scope of this invention.

What I claim is:

1. A traffic signal control system controlling a signal at an intersection to display green aspects alternately to traffic on each of at least two interfering approaches to said intersection, vehicle detector means of the presence detecting type for each said approach for respectively demarcating successive intervals $t_A$ and $t_B$ in which each $t_A$ is the time required for a vehicle to pass through a given detection zone on said first approach and $t_B$ is the time required for a vehicle to pass through a given detection zone on the second of said approaches, and means operatively connected with both said vehicle detector means for generating a manifestation whose value is representative of $(\Sigma t_A - \Sigma t_B)$ over any measuring time, and control means responsive to the value of said manifestation for adjusting the relative green times displayed by said signal to said first and second approaches.

2. The system of claim 1 in which there are at least two generally non-interfering approaches to said intersection simultaneously receiving a green aspect from said signal, said detection means defining respective detection zones on both said non-interfering approaches and demarcating the time of occupancy of either of the respective zones.

3. The system of claim 1 which includes means for controlling said signals to initiate the display of a green aspect on a first of said approaches at regularly recurring intervals demarcating successive cycles, said control means governing the duration of the green time displayed by said signal on said one approach according to the value of said manifestation.

4. The system of claim 1 wherein said generating means includes, filter circuit means having input terminals and output terminals, circuit means governed by both said detector means for applying a voltage $V_1+V_2/2$ to said input terminals during any time in which said detector means is registering the presence of a vehicle in the detection zone for the first of said approaches only, applying a voltage $V_1-V_2/2$ to said input terminals during any time interval in which said detection means detects the presence of a vehicle in the detection zone for the second of said approaches only, and applying the voltage $V_1$ to said input terminals during any time interval in which said detection means detects the presence of vehicles simultaneously in both or neither of the detection zones for said first and second approaches, whereby the voltage appearing at said output terminals of said filter circuit means comprises said manifestation.

5. The system of claim 3 wherein said control means applies said voltage to a capacitor upon the initiation of the green period for said first approach, circuit means for charging said capacitor with said voltage analog at a constant current rate, means responsive to the cycle length demarcated by said control means for governing the charging rate of said capacitor, and means responsive to the voltage across said capacitor for maintaining said signal in a condition to display said green aspect to traffic on said first approach for as long as the voltage on said capacitor is below some predetermined minimum value.

6. The system of claim 5 in which said control means applies said voltage analog through said capacitor to the cathode of an electron tube to thereby cause said tube to become non-conductive, and means responsive to the non-conductive condition of said tube to maintain said signal in the condition where a green signal is displayed for said first approach.

7. The system of claim 6 including a relay energized by the plate-cathode current of said tube, and circuit means governed by the actuation of said relay resulting from the restoration of said tube to its conductive state to terminate said green period for said first approach, to cause an amber signal to be displayed for a predetermined period on said first approach, and thereafter to initiate a green period for said second approach.

8. In a traffic signal control system providing accord of right-of-way alternately to each of at least two mutually interfering streets, a presence-type vehicle detector for each said street and responsive to vehicles approaching said intersection and passing through a detection zone defined by said detector, each said vehicle detector producing in response to each detected vehicle a manifestation representative of the detection period for said detected vehicle in said detection zone, means operatively connected to said vehicle detectors for both said streets for generating a control manifestation representative of the amount by which the cumulative vehicle detection periods demarcated by said detector for one said street relative to total elapsed time vary in relation to the cumulative detection periods demarcated by said detector for the other of said streets relative to total elapsed time, and means controlled by said last-named means for controlling the relative durations of the accord periods presented by said signal to traffic on the respective interfering streets.

9. In a traffic signal control system providing accord of right-of-way alternately to each of at least two mutually-interfering streets; at least one presence-type vehicle detector on each of said streets each defining a respective detection zone traversed by vehicles travelling on the corresponding street and approaching said intersection and providing in response to each detected vehicle a manifestation representative of the occupancy time interval of such vehicle in said detection zone; first means operatively connected to said vehicle detectors for generating a control manifestation having a value representative of the relative values of, respectively, the cumulative vehicle occupancy time intervals relative to total elapsed time demarcated by said vehicle detector for one of said interfering streets and the cumulative vehicle occupancy time intervals relative to total elapsed time demarcated by said vehicle detector for the other of said streets, and traffic signal control means connected to said first means for controlling the ratio of the accord periods presented by said traffic signal to said two streets in accordance with the value of said control manifestation.

10. The invention as defined in claim 9 which further includes means variable in accordance with an adjustable signal cycle length, said traffic signal control means being responsive to both said first means and to said variable means for demarcating a time period representative of the accord of right-of-way period for said one street as a variable percentage of the length of signal cycle in effect at any time with said percentage being dependent upon the value of said control manifestation.

11. In a system for the control of traffic signals governing traffic at a plurality of intersections of an artery with respective cross streets the combination comprising, at least one presence-type vehicle detector for detecting vehicles on said artery, at least one presence-type vehicle detector for detecting vehicles on a selected one of said cross streets and approaching the intersection of such cross street with said artery, each said vehicle detector defining a detector zone and demarcating for each detected vehicle a vehicle detection interval which at least approximates the time required for such vehicle to pass through the respective zone, means operatively connected to both said vehicle detectors for said artery and cross street respectively for generating a control manifestation whose value is representative of the relative cumulative vehicle detection times of said first and second vehicle detectors relative to total elapsed time and signal control means for controlling the relative accord of right-of-way periods presented by at least one of said signals to artery and cross street traffic respectively in accordance with the value of said control manifestation.

12. In a traffic signal control system for according right-of-way alternately to at least two mutually interfering rights-of-way at an intersection of streets comprising, at least one vehicle detector of the presence-detecting type for detecting vehicles on one of said streets and at least one other vehicle detector also of the presence-detecting type for detecting vehicles on a second of said streets, each said vehicle detector defining a detection zone and demarcating for each vehicle detected the occupancy time of said vehicle in said zone, signal accumulating means, means coupled between said one vehicle detector and said signal accumulating means for adding to the signal accumulated therein in response to each vehicle detected and by an amount representative of the occupancy time of the detected vehicle in the respective detection zone, means coupled between said another vehicle detector and said signal accumulating means for subtracting from the signal accumulated therein for each vehicle detected and by an amount representative of the occupancy time of the detected vehicle in the respective detection zone, and traffic signal control means responsive to the signal in said signal accumulating means for controlling the relative durations of the accord periods presented by said signal to said interfering rights-of-way respectively.

13. The system of claim 12 in which said signal accumulating means includes a capacitor and the voltage across said capacitor controls the duration of the right-of-way period accorded to said signal to traffic on one of said streets and crossing said intersection.

14. The system of claim 12 which further includes means variable in accordance with a variable length of the signal cycle for said signal, and means responsive jointly to said variable means and to said signal accumulating means for adjusting the duration of the period during which right-of-way is accorded traffic on one of said streets and crossing said intersection.

15. The system of claim 12 in which further means demarcates the duration of the signal cycle for said traffic signal and said traffic signal control means adjusts only the relative durations of the accord periods presented by said signal to said interfering rights-of-way respectively, thereby varying cycle split without varying cycle duration.

16. In a traffic signal control system providing accord of right-of-way alternately to each of at least two mutually-interfering streets; at least one presence-type vehicle detector on each of said streets each defining a respective detection zone traversed by vehicles travelling on the corresponding street and approaching said intersection and providing in response to each detected vehicle a manifestation representative of the occupancy time interval of such vehicle in said detection zone; first means operatively connected to said vehicle detectors for generating a control manifestation having a value representative of the relative values of, respectively, (a) the ratio of the cumulative vehicle detection periods demarcated by said vehicle detector for one of said interfering streets to total elapsed time throughout any given measuring interval and (b) the ratio of the cumulative vehicle detection periods demarcated by said vehicle detector for the other of said interfering streets to total elapsed time throughout any given measuring interval; and traffic signal control means connected to said first means for controlling the ratio of the accord periods presented by said traffic signal to said two streets in accordance with the value of said control manifestation.

References Cited by the Examiner

UNITED STATES PATENTS

| 2,126,431 | 8/1938 | Opel | 340—31 |
| 2,542,978 | 2/1951 | Barker | 340—35 |
| 2,750,576 | 6/1956 | Beaubien | 340—37 |
| 3,120,651 | 2/1964 | Hendricks | 340—35 |

NEIL C. READ, *Primary Examiner.*

THOMAS B. HABECKER, *Examiner.*